(12) United States Patent
Ver Steeg et al.

(10) Patent No.: US 12,527,110 B2
(45) Date of Patent: Jan. 13, 2026

(54) PHOTODIODE FOR WEARABLE DEVICES

(71) Applicant: ROCKLEY PHOTONICS LIMITED, Altrincham (GB)

(72) Inventors: Benjamin Ver Steeg, Redlands, CA (US); Sean Merritt, Lake Forest, CA (US); Adam Gardner, Mission Viejo, CA (US)

(73) Assignee: Rockley Photonics Limited, Altrincham (GB)

( * ) Notice: Subject to any disclaimer, the term of this patent is extended or adjusted under 35 U.S.C. 154(b) by 781 days.

(21) Appl. No.: 17/816,900

(22) Filed: Aug. 2, 2022

(65) Prior Publication Data

US 2023/0051794 A1    Feb. 16, 2023

Related U.S. Application Data

(60) Provisional application No. 63/229,431, filed on Aug. 4, 2021.

(51) Int. Cl.
| | |
|---|---|
| *H10F 77/14* | (2025.01) |
| *A61B 5/00* | (2006.01) |
| *G02B 6/42* | (2006.01) |
| *H10F 30/21* | (2025.01) |
| *H10F 77/124* | (2025.01) |
| *H10F 77/60* | (2025.01) |

(52) U.S. Cl.
CPC ......... *H10F 77/147* (2025.01); *A61B 5/0059* (2013.01); *H10F 77/60* (2025.01); *G02B 6/4215* (2013.01); *H10F 30/21* (2025.01); *H10F 77/1248* (2025.01)

(58) Field of Classification Search
None
See application file for complete search history.

(56) References Cited

U.S. PATENT DOCUMENTS

| | | | |
|---|---|---|---|
| 6,312,155 B1 * | 11/2001 | Stool | G01N 33/4833 374/134 |
| 10,677,989 B2 | 6/2020 | Abediasl et al. | |
| 10,739,256 B1 | 8/2020 | Rickman et al. | |
| 2005/0249509 A1 | 11/2005 | Nagarajan et al. | |
| 2013/0175438 A9 | 7/2013 | Ford et al. | |
| 2019/0353767 A1 * | 11/2019 | Eberspach | G01S 7/4814 |

FOREIGN PATENT DOCUMENTS

| | | |
|---|---|---|
| WO | WO 2016/191307 A1 | 12/2016 |
| WO | WO 2021/116766 A1 | 6/2021 |
| WO | WO 2021/116766 A8 | 6/2021 |

OTHER PUBLICATIONS

International Search Report and Written Opinion of the International Searching Authority, mailed Nov. 15, 2022, corresponding to PCT/EP2022/071930, 12 pages.

(Continued)

*Primary Examiner* — Carolyn Fin
(74) *Attorney, Agent, or Firm* — Womble Bond Dickinson (US) LLP (57) ABSTRACT

The present invention provides a photodiode for a wearable sensor system, the photodiode having a rectangular active area sensitive to wavelengths within the spectral range of 1200 nm to 2400 nm. The present invention also provides a wearable sensor system comprising the photodiode.

15 Claims, 9 Drawing Sheets

(56) References Cited

OTHER PUBLICATIONS

Loi, R. et al., "Transfer Printing of AlGaInAs/InP Etched Facet Lasers to Si Substrates", IEEE Photonics Journal, Nov. 11, 2016, 11 pages, vol. 8, No. 6, IEEE.

Website: "Extended InGaAs Image Sensors Questions & Answers", Hamamatsu, printed Apr. 19, 2023, 4 pages, https://hub.hamamatsu.com/us/en/ask-an-engineer/imaging/extended-ingaas-image-sensors-questions-and-answers.html.

Zilkie, A. J., "Power-efficient III-V/Silicon external cavity DBR lasers", Optics Express, Sep. 27, 2012, pp. 23456-23462, vol. 20, No. 21, Optical Society of America.

Zilkie, A. J., "Multi-Micron Silicon Photonics Platform for Highly Manufacturable and Versatile Photonic Integrated Circuits", IEEE Journal of Selected Topics in Quantum Electronics, Apr. 15, 2019, 13 pages, vol. 25, No. 5, IEEE.

\* cited by examiner

Cross section view with lid shown

PHOTODIODE FOR WEARABLE DEVICES

CROSS-REFERENCE TO RELATED APPLICATION(S)

The present application claims priority to and the benefit of U.S. Provisional Application No. 63/229,431, filed Aug. 4, 2021, entitled "PHOTODIODE FOR WEARABLE DEVICES", the entire content of which is incorporated herein by reference.

FIELD

One or more aspects of embodiments according to the present invention relate to a photodiode for wearable devices, and more particularly to a photodiode having a rectangular or substantially rectangular active area sensitive to wavelengths within the spectral range from 1200 nm to 2400 nm inclusive.

BACKGROUND

Optical sensors for wearable devices (e.g. personal fitness/health monitoring devices) capable of measuring various biomarkers (e.g. pulse, oxygen concentration) of a user of the wearable device are known. It is desirable that such optical sensors be able to detect organic compounds that are in relatively low concentrations in human organisms e.g. glucose, ethanol, and lactate. Accurately detecting these compounds requires operating the optical sensors at wavelengths ranging from 1200 nm to 2400 nm, and more specifically from 2000 nm to 2400 nm. Additionally, it imposes stringent requirements on signal-to-noise ratio (SNR) and on spectral responsivity which are met by few optical sensors. Further complications arise from the relatively high signal attenuation in tissues, e.g., due to the high water content of the human body.

Known examples of optical sensors meeting these requirements include "extended" InGaAs photodiodes, i.e. InGaAs photodiodes having an extended cutoff wavelength of up to 2600 nm at operation temperature of 25° C. These are commonly used in benchtop instrumentation for measuring light of up to and including 2400 nm. In order to meet the desired performance requirements (e.g. SNR and spectral responsivity), these photodiodes are typically cooled to sub-zero Celsius temperatures by thermoelectric coolers.

When coupled to optical sensors such as photodiodes, thermoelectric coolers serve three key functions. Firstly, thermoelectric coolers reduce the temperature of the sensor, thereby reducing the thermally generated "detector noise", also known as Johnson noise, which is directly proportional to the temperature, T, of the sensor. Specifically, the Johnson noise depends on temperature as $4\ kT/R_d$ in units of A/(Hz$^{1/2}$), where k is the Boltzmann constant and $R_d$ is the shunt resistance of the sensor. Secondly, by decreasing the sensor's temperature, T, thermoelectric coolers logarithmically increase the value of the sensor's shunt resistance, $R_d$. Thirdly, thermoelectric coolers stabilize the sensor's spectral responsivity. That is, at lower temperatures, the spectral (wavelength) responsivity is significantly reduced as the cutoff wavelength shifts to lower values.

For benchtop systems, the use of a photodiode, such as an extended InGaAs photodiode, having a longer cutoff wavelength, i.e. 2600 nm at 25° C.), in combination with a thermoelectric cooler, is an appropriate solution for simultaneously maintaining high spectral responsivity at 2400 nm and good SNR performance.

However, thermoelectric coolers are not suitable for use in wearable devices such as personal fitness/health monitoring devices. This is due to both space constraints and battery power consumption. Additionally, in use, wearable optical sensors are in close thermal contact with a user's skin. This makes it difficult to reject a sufficient amount of heat from the wearable optical sensors, e.g. to a heat sink, in order to ensure low-temperature operation. Furthermore, a preferred class of optical sensors used in wearable devices uses a highly integrated silicon photonics integrated circuit (PIC) as a light source for the sensor, further complicating low-temperature operation due to electrical power dissipation within the sensor module.

When extended InGaAs photodiodes (e.g. having a cutoff wavelength of 2600 nm) are not coupled to thermoelectric coolers but are instead operated at elevated temperatures, e.g. between 25° C. and 35° C., their noise performance becomes unacceptable.

Thus, it is desirable to provide an improved optical sensor system which is suitable for use in wearable devices, is capable of detecting organic compounds that are in relatively low concentrations in human organisms such as glucose, ethanol, and lactate, and does not require the use of thermoelectric coolers.

SUMMARY

The present invention has been devised in light of the above considerations.

In a first aspect, the present invention provides a photodiode for a wearable sensor system, the photodiode having a rectangular active area sensitive to wavelengths within the spectral range of 1200 nm to 2400 nm.

Advantageously, providing the photodiode with a rectangular active area instead of e.g. a circular active area, can lead to a significant (e.g. about a four-fold) improvement in optical coupling between the photodiode and remitted light generated by a light source and reflected by e.g. a user's skin. Thus, the photodiode's efficiency can be increased simply by changing the active area's geometry and without necessarily increasing the amount of material required to form the active area. Furthermore, configuring the photodiode such that its active area is sensitive to wavelengths within the spectral range of 1200 nm to 2400 nm ensures that the photodiode can be used to reliably measure biomarkers, e.g. to detect glucose, ethanol, and lactate in the user's body by illuminating the user's skin.

Optional features of the present invention are outlined below. These are applicable singly or in combination with each other except where such a combination is clearly impermissible or expressly avoided.

Preferably, the active area of the photodiode is sensitive to wavelengths within the range from 2000 nm to 2400 nm. This range is particularly suitable for optical measurements of biomarkers.

Optionally, the photodiode may have a cutoff wavelength of 2500 nm or less, at operation temperature within the range of 25° C. to 35° C. Advantageously, it has been found that a photodiode having a cutoff wavelength of 2500 nm can exhibit spectral responsivity greater than 1.2 A/W when illuminated with 2400 nm light at operation temperature within the range of 25° C. to 35° C. The photodiode may have a cutoff wavelength of 2450 nm or less at operation temperature within the range of 25° C. to 35° C. Generally, photodiodes having lower cutoff wavelength exhibit higher shunt resistance which can in turn reduce the photodiode's Johnson noise improve the SNR.

Optionally, the active area may be formed of InGaAs.

Optionally, the active area may be formed of extended InGaAs. Conveniently, by controlling a lattice mismatch between InGaAs and InP, it is possible to provide extended InGaAs whose properties, e.g. cutoff wavelength, are tunable as required. Specifically, forming the active area of extended InGaAs can ensure that the photodiode's cutoff wavelengths is lower than 2600 nm, e.g. 2500 nm or 2450 nm at operation temperature within the range of 25° C. to 35° C.

Optionally, the photodiode may comprise a temperature control for controlling an operation temperature of the photodiode. Conveniently, this can reduce variations/fluctuation in operation temperature of the photodiode thereby stabilizing its thermal performance. For example, the temperature control may be configured such that the operation temperature of the photodiode varies by no more than a few degrees during all operation conditions.

Optionally, the temperature control may use a user's body as a heat sink or heat source. A heat-conductive outer surface of the wearable device may be in contact with the user's skin when the device is worn, and the heat conductive outer surface may be directly or indirectly coupled to the photodiode to conduct heat to and/or from the photodiode. Thus, the user's body temperature can be used as a reference temperature to which the photodiode's operation temperature is stabilized. Thus, when the user's body is warmer than the photodiode, the photodiode's operation temperature can be increased, and when the wearable unit (including the photodiode) is warmer than the user's body, the whole system can reject heat into the user's body, thereby reducing the operation temperature of the photodiode. Therefore, the photodiode's operation temperature can be stabilized around the user's body temperature.

Optionally, the temperature control may comprise a variable-temperature element coupled to the photodiode. For example, the variable-temperature element may be configured to increase or decrease its own temperature and the photodiode's temperature (e.g. by exchanging heat with the photodiode). Thus, the photodiode's operation temperature can be controlled and stabilized as required. The variable-temperature element may be a heater, such as a simple resistor with current running through it.

Optionally, the temperature control may comprise a light source configured for variable duty-cycle operation. For example, the light source may be configured to operate in cycles such that "on" periods of light generation are followed by "off" periods of no light generation. When the photodiode is provided with a variable-temperature element, the variable-temperature element may vary its temperature based on the variable duty-cycle operation of the light source. For example, the variable-temperature element may increase its temperature during "off" periods of no light generation such that the photodiode's operation temperature is prevented from falling below a predetermined threshold.

Optionally, the light source may be located on a photonic integrated circuit, PIC. For example, the PIC may be a highly integrated silicon PIC.

Optionally, the light source may be a laser.

Optionally, the photodiode may have a shunt resistance of at least 100 kΩ, or at least 175 kΩ, or at least 300 kΩ at an operation temperature within the range of 25° C. to 35° C. Thus, a relatively high SNR can be achieved at operation temperatures comparable to a user's body temperature.

Optionally, the photodiode may have a signal-to-noise ratio of at least 5.0, or at least 8.0, or at least 14.9 at an operation temperature within the range of 25° C. to 35° C.

Optionally, the photodiode may have a spectral responsivity of at least 0.8 A/W, or at least 1.2 A/W at operation wavelength of 2400 nm and/or at operation temperature within the range of 25° C. to 35° C.

In second aspect, the present invention provides a wearable sensor system comprising the photodiode of the first aspect.

Optionally, the wearable sensor system may further comprise a light source located adjacent to the photodiode on the same surface of the sensor system, the light source generating light within the range of 1200 nm to 2400 nm. Thus, light generated by the light source can be reflected by the user's skin and be detected by the active area of the photodiode.

Optionally, the separation between the centre of the output of the light source and proximal edge of the photodiode may be no more than 1 mm for wavelengths within the range of 2000 nm to 2400 nm and no more than 3 mm for wavelengths within the range of 1200 nm to 1800 nm. Conveniently, these separations values can ensure optimized spectral sensitivity over the total wavelength range from 1200 nm to 2400 nm.

BRIEF DESCRIPTION OF THE DRAWINGS

These and other features and advantages of the present invention will be appreciated and understood with reference to the specification, claims, and appended drawings wherein:

DETAILED DESCRIPTION

The detailed description set forth below in connection with the appended drawings is intended as a description of exemplary embodiments of a photodiode for a wearable sensor system provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

A conventional photodiode 100 having a circular active area 110 is discussed with reference to FIG. 1. Circular active areas in photodiodes are typically used for detecting light in the range 1200 nm to 2400 nm, e.g. because they are more suitable for coupling to optical fibers which have a circular cross-section and are a common choice of light carrier. The active area 110 has a radius R which may for example measure 0.5 mm, and spans an area A. The area A may be about 0.79 mm$^2$. The active area 110 is illuminated by a light source 20. The light source 20 may be for example a located on a PIC, e.g. a highly integrated PIC and/or made of a semiconductor material such as Si. The light source may be a laser (or a plurality of lasers). The light source may generate light in the range 1200 nm to 2400 nm.

The light source 20 may be located adjacent to the photodiode and on the same surface of e.g. a sensor system such that light generated by the light source 20 is reflected by the user's skin to then illuminate the active area 110 of the photodiode 100. The separation between the centre of the output of the light source 20 and a proximal edge of the photodiode 100 may be no more than 1 mm for spectral sensitivity in the long wavelength optical window (from 2000 nm to 2400 nm) and no more than 3 mm for the shorter wavelength window (from 1200 nm to 1800 nm).

Next, a photodiode 1 according to the first aspect is described with reference to FIGS. 2A and 2B. The photodiode 1 of this aspect has a rectangular active area with a width W and a length L. Similarly to the photodiode 100 of FIG. 1, his photodiode 1 is also illuminated by a light source 20. The light source 20 may be similar or identical to the light source 20 shown in FIG. 1. The separation between the centre of the output of the light source 20 and a proximal edge of the photodiode 1 may be the same in FIGS. 1-2B. Here, the active area of all three photodiodes 1, 100 of FIGS. 1-2B measures the same, i.e. A.

Figures 1, 2A, 2B:
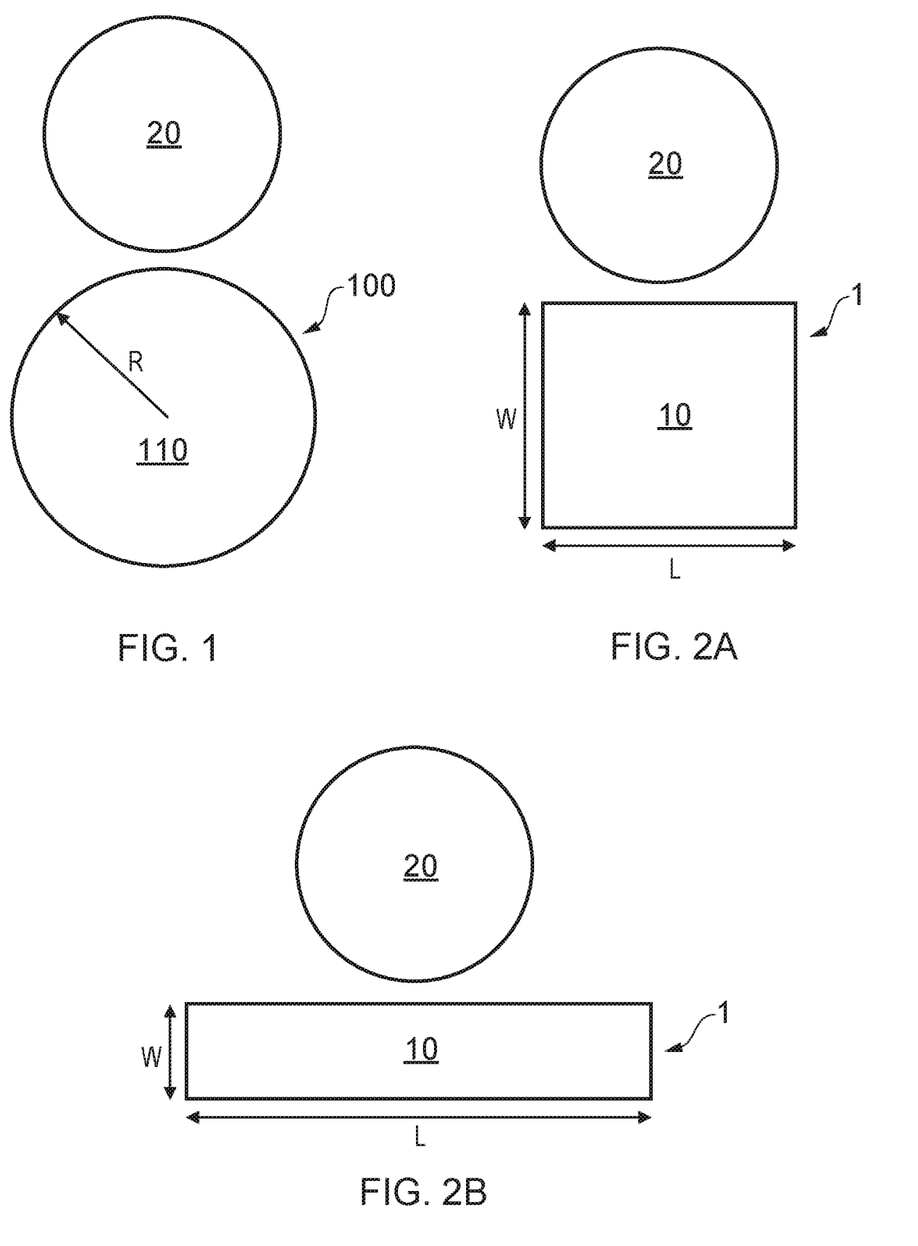
FIG. 1 shows a conventional photodiode having a circular active area illuminated by a light source.
FIGS. 2A and 2B each show a variant of a photodiode according to the present invention, the photodiode having a rectangular active area illuminated by a light source.

The active areas 10 of the photodiodes 1 of FIGS. 2A-2B span the same area, A, but have different respective widths W and lengths L. The width W should be understood to extend in a direction away from the light source 20, where a greater width W represents a greater proportion of photodiode 1 extending in a direction away from the light source 20. The length L denotes the direction transverse to the width W, a greater length L therefore corresponding to a greater proportion of the photodiode 1 extending in a direction alongside the light source 20. For example, as shown in the embodiment of FIG. 2A, the active area 10 of the photodiode 1 of can be square or substantially square, i.e. respectively such that W=L, or W≈L. In contrast, the active area 10 of the photodiode 1 of FIG. 2B is characterized by a length L larger than the width W, i.e. L>>W. By increasing the length L relative to the width, it is possible to increase (for a given area) the proportion of the active area of the photodiode 1 which is proximate the light source 20. This is particularly advantageous for wavelengths within the range of 1200 nm to 2400 nm because of increased light absorption by the skin at these wavelengths. For very high tissue absorption, light gets absorbed before propagating very far into the skin. Therefore, a narrower photodiode with an active area closer to the light source is more suitable for detecting the scattered light. In other words, the rectangular photodiode, having two longer edges and two shorter edges, is advantageously placed so that one of its longer edges is proximal to the light source and that its shorter sides extend away from the light source.

Figure 3:
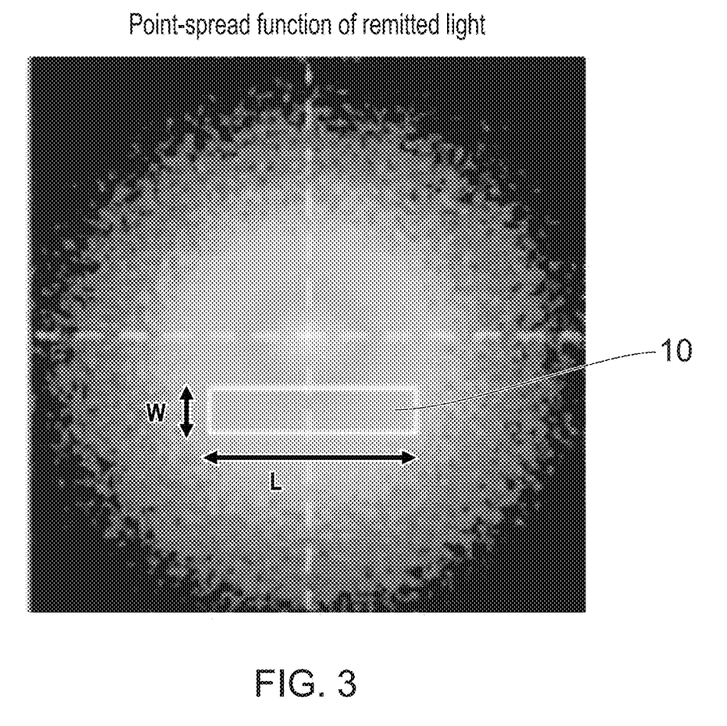
FIG. 3 shows a plot of the point-spread function (PSF) of remitted light generated by a light source and reflected from synthetic tissue.

FIG. 3 shows an example of a point-spread function (PSF) of remitted light generated by the light source 20 and reflected by synthetic tissue (i.e. tissue which is designed to have similar or identical properties to human skin tissue). The active area 10 of the photodiode 1 is represented by the white-outline rectangle. In this case the active area is similar to that shown in FIG. 2B, i.e. L>>W. It can be seen that the active area 10 is illuminated only by a small proportion of the total remitted light. That is, most of the remitted light does not overlap with the active area 10 and therefore, the photodiode is not efficiently coupled to the remitted light.

Figure 4:
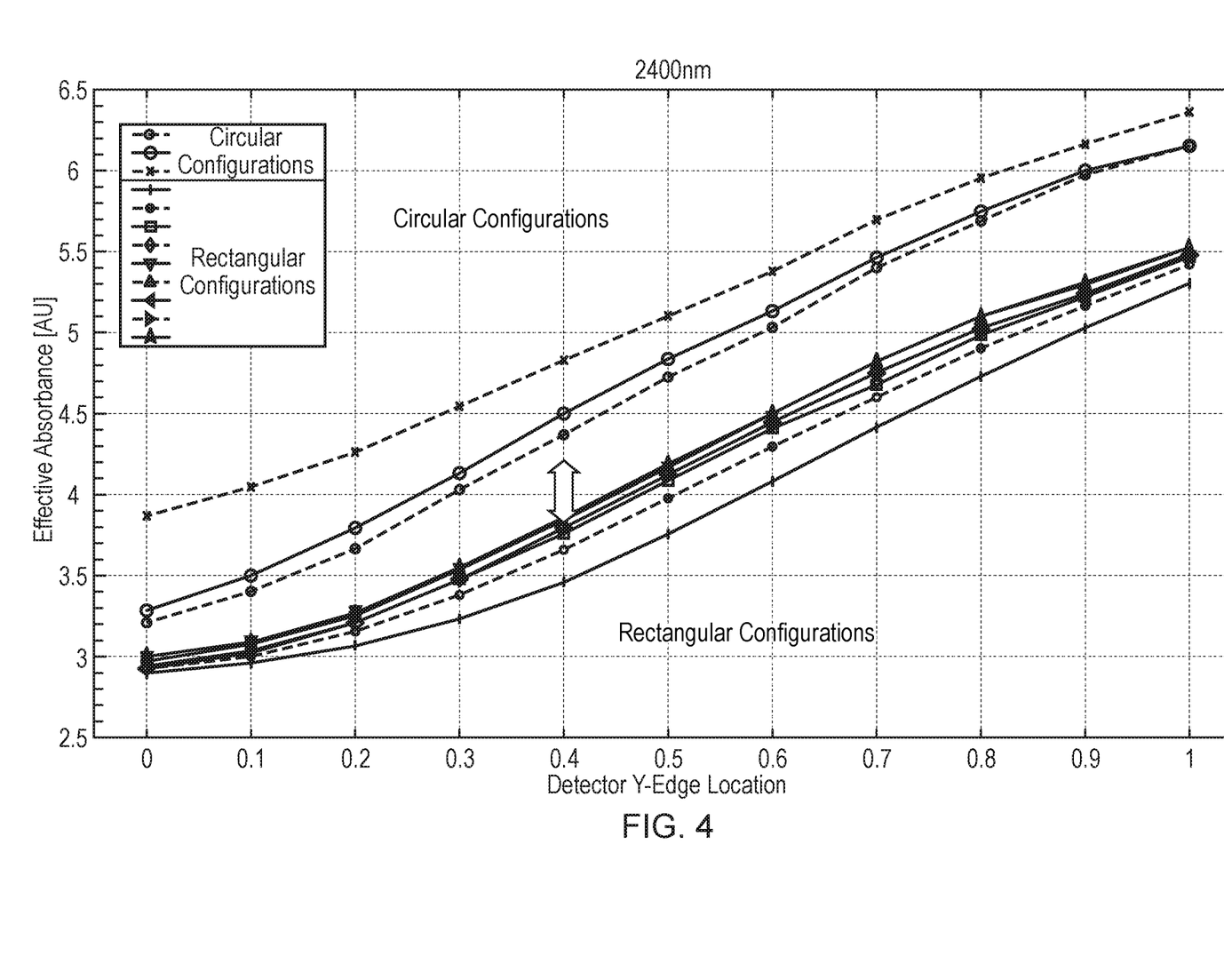
FIG. 4 shows a comparative logarithmic plot of effective absorbance as a function of detector Y-edge location for photodiodes having respective circular and rectangular active areas.

Nevertheless, it has been observed that photodiodes 1 comprising rectangular active areas 10 such as those discussed with reference to FIGS. 2A and 2B generally exhibit an improved optical coupling efficiency compared to photodiodes 100 comprising circular active areas 110 such as the one shown in FIG. 1. This effect is shown in FIG. 4 which is a comparative logarithmic plot of effective absorbance as a function of detector Y-edge location for photodiodes having respective circular and rectangular active areas. The comparative plot has been obtained by an advanced Monte Carlo simulation. All photodiode configurations (both circular and rectangular) are illumined with light having a wavelength of 2400 nm.

There are three circular configurations (i.e. having a circular active area) which include one photodiode having a circular active area with radius R=0.5 mm and A=0.79 mm$^2$, and two photodiodes having respective circular active areas, each having a radius R=0.3 mm and A=0.28 mm$^2$. The rectangular configurations each have a rectangular active area spanning 0.79 mm$^2$. However, the different rectangular configurations have respective different L/W ratios.

In FIG. 4, the rectangular configurations generally show lower values of effective absorbance than the circular configurations. This indicates an approximately four-fold logarithmic improvement in optical coupling compared to circular configurations. All rectangular configurations perform better than the circular configuration spanning the same active area (i.e., the blue open-circle curve, between the two curves corresponding to the two remaining circular configurations). As discussed with reference to FIG. 3, it is desirable to configure the photodiode 1 such that its active area 10 maximally overlaps with the PSF of the remitted light for optimized optical coupling.

This can be achieved by varying the ratio L/W. In FIG. 4, the L/W ratio is linearly varied from 5:1 (corresponding to bottommost solid blue curve with cross symbols) to 1:1 (corresponding to topmost solid red-brick curve). There is an optimal value of the ratio L/W (i.e. L/W=5 corresponding to the bottommost solid blue curve with cross symbols) which remains the same as the photodiode is progressively moved farther away from the light beam generated by the light source 20 and incident on the synthetic tissue. However, moving away from the optimal L/W ratio, i.e. further towards a square-like geometry (where L/W=1, corresponding to the top-most solid brick-red curve), reduces the light collection efficiency of the photodiode 1.

Thus, for optical wavelengths which exhibit significant absorbance losses in skin, e.g. 2400 nm, significant optimization in noise performance (i.e. SNR) can be realized through optimized photodiode geometry without increasing the amount of photodiode material required, thereby reducing costs.

Next, it has also been observed that by lowering the cutoff wavelength of a photodiode, it is possible to increase the magnitude of the photodiode's shunt resistance, thereby decreasing the amount of Johnson noise and improving the SNR of the photodiode. The photodiode may have a circular or a rectangular active area.

The above effect is summarized by TABLE 1 which includes values for typical shunt resistance, $R_d$, spectral responsivity at 2400 nm, Johnson noise, and relative SNR at operation temperature of 35° C. for three different photodiode cutoff wavelengths. It can be seen that by lowering the cutoff wavelength from the standard 2650 nm provided by off-the-shelf photodiodes to e.g. 2500 nm or 2450 nm, the shunt resistance, $R_d$, can be increased to up to 300 kΩ, thereby increasing the SNR nearly 15-fold.

TABLE 1

| Wavelength Cutoff (nm) | Typical $R_d$ (kΩ) at 35° C. | Spectral responsivity (A/W) at 2400 nm, at 35° C. | Johnson noise at 35° C. (A/(Hz$^{1/2}$)) | Relative detector SNR |
|---|---|---|---|---|
| 2650 | 20 | 1.3 | $8.50 \times 10^{-25}$ | 1.0 |
| 2500 | 175 | 1.2 | $9.70 \times 10^{-26}$ | 8.8 |
| 2450 | 300 | 0.8 | $5.70 \times 10^{-26}$ | 14.9 |

Figure 5:
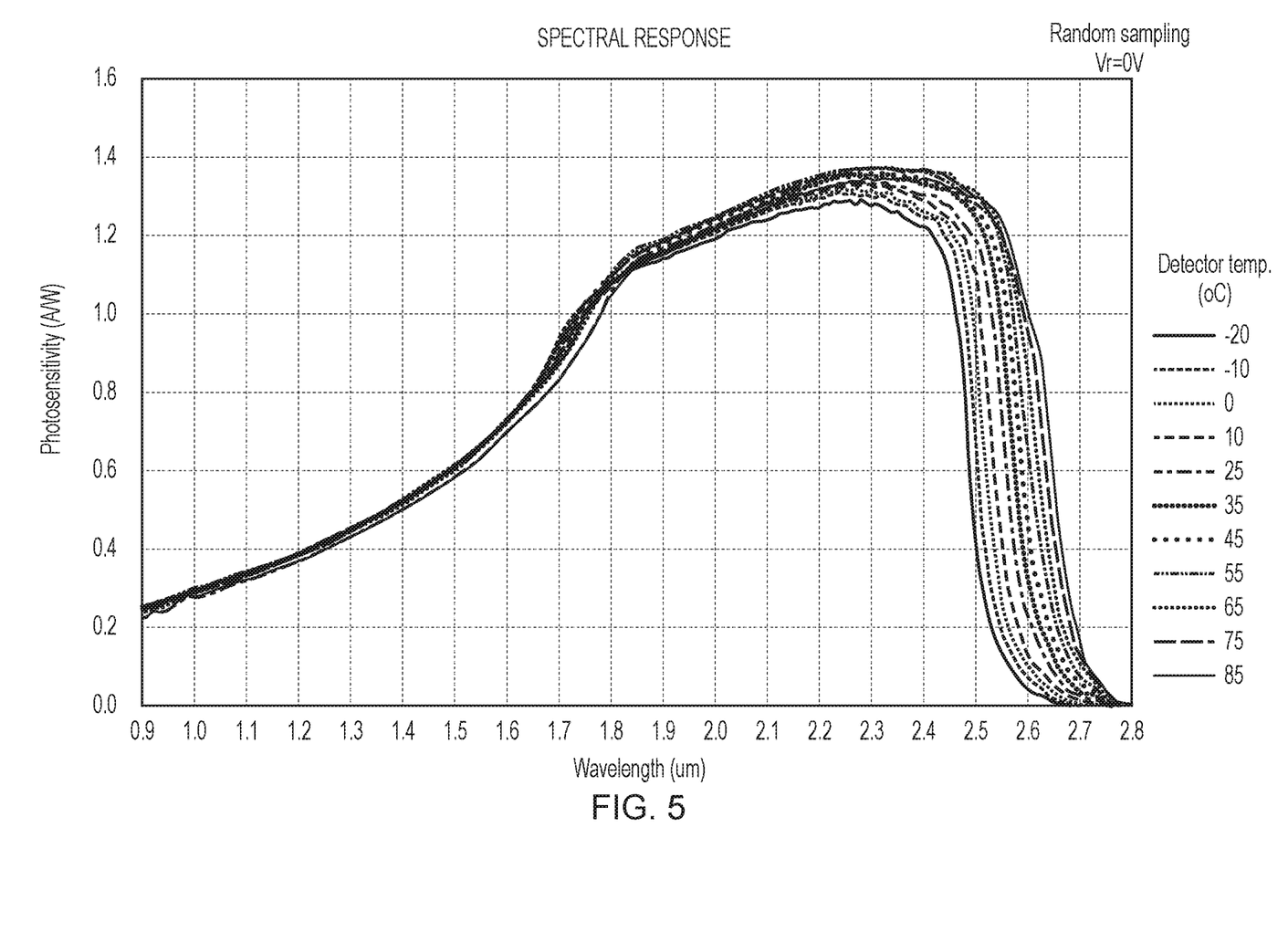
FIG. 5 shows the spectral response of a typical photodiode having a cutoff wavelength of 2650 nm for a range of photodiode operation temperatures.
Figure 6:
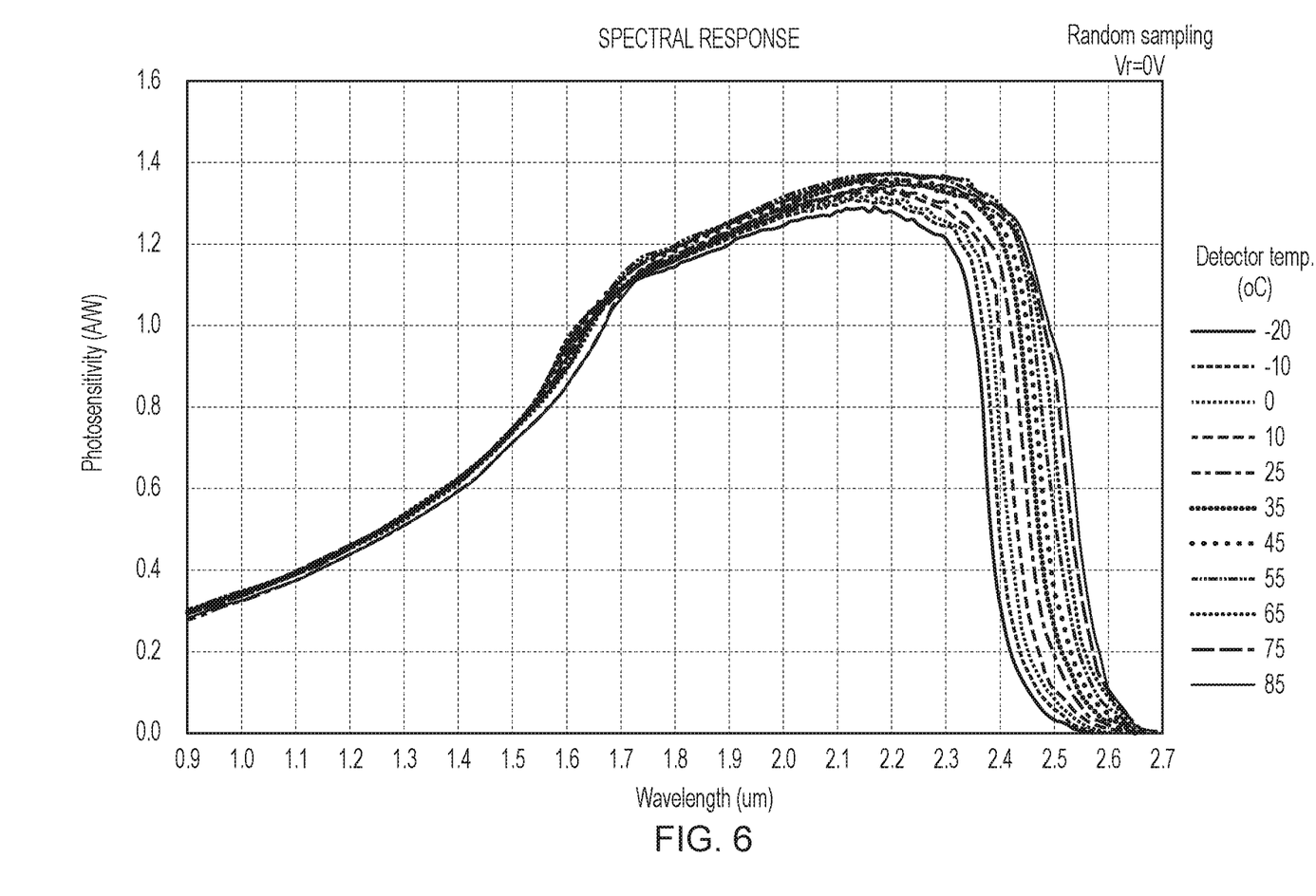
FIG. 6 shows the spectral response of a photodiode according to an embodiment of the present invention having a cutoff wavelength of 2500 nm for a range of photodiode operation temperatures.

FIGS. 5 and 6 show the spectral response respectively of an off-the-shelf photodiode having a cutoff wavelength of 2650 nm and of a photodiode according to an embodiment of the present invention having a reduced cutoff wavelength of 2500 nm. The respective spectral responses of the photodiodes are shown for a range of operation temperatures spanning −20 to 85° C. For biomarker (e.g. glucose, ethanol, lactate) detection, it is desirable that a photodiode has a photosensitivity of at least 0.8 A/W, and more preferably at least 1.2 A/W when the wavelength of a light source illuminating the photodiode is about 2400 nm.

With reference to FIG. 5, the off-the-shelf photodiode exhibiting a cutoff wavelength of 2650 nm demonstrates a responsivity above 1.2 A/W at 2400 nm for all operation temperatures shown. However, at elevated temperatures such as 35° C., its SNR is critically low, e.g. 1.0 (as seen from TABLE 1). Therefore, while photodiodes with a cutoff wavelength of 2650 nm show good photosensitivity over a range of temperatures, their noise performance at elevated temperatures, such as body temperature, is unsuitable for high-performance applications such as detection of biomarkers.

With reference to FIG. 6, the photodiode exhibiting a reduced cutoff wavelength of 2500 nm demonstrates a spectral responsivity above 1.2 A/W at 2400 nm for operations of 35° C. and above, and has a significantly improved noise performance. For example, at 35° C. its SNR is 8.8 (see TABLE 1). Thus, photodiodes having a reduced cutoff wavelength of less than 2650 nm, or less than 2500 nm, or less than 2450 nm are suitable for detection of biomarkers at operation temperatures comparable to a user's body temperature. Conversely, at temperatures lower than 35° C., the spectral responsivity of the photodiode drops below 1.2 A/W, e.g. to 0.6 A/W at −10° C. making it less suitable for cooled (i.e. low-temperature) operation at 2400 nm.

A wearable sensor system according to the second aspect is discussed with reference to FIGS. 7A-11. The wearable sensor system comprises an optical sensing module 1000 discussed with reference to FIGS. 7A-8. The optical sensing module 1000 includes a transmitter PIC 4 located on a substrate 2. The PIC 4 includes a plurality of lasers, each laser of the plurality of lasers operating at a wavelength that is different from the wavelength of the others. The plurality of lasers form part of a light source 20 generating light in the range 1200 nm to 2400 nm. The plurality of lasers can also be configured for variable duty-cycle operation. The interrogating laser light may be varied in amplitude, phase, polarization, or in other optical properties or a combination of such optical properties. Pulsing of the light can reduce the power consumption of the device and lead to longer battery life.

The PIC 4 also includes an optical manipulation region for manipulating the light in any way required prior to transmission via one or more optical outputs 12 to the surface (e.g. tissue) to be analyzed. An optical element such as a mirror 15 (e.g. prism mirror) may be present. The optical manipulation region includes one or more of: an optical modulator, optical multiplexer (MUX); and additional optical manipulation elements such as power taps, lenses and power splitters.

In this example, the light source 20 also includes a plurality of non-laser light sources such as LEDs, 5 (e.g. visible 5a or near infrared 5b wavelength LEDs).

One or more photodetectors 1, 1' also form part of the optical sensing module 1000. Here, the photodetectors are located on the substrate 2 but are not part of the PIC 4. However, it is envisaged that the photodetectors could be located as an integral part of the transmitter/receiver PIC 4. In this example, the plurality of photodetectors includes silicon 1' and InGaAs 1 photodiodes of the type described with reference to FIGS. 2A and 2B.

Figure 8:
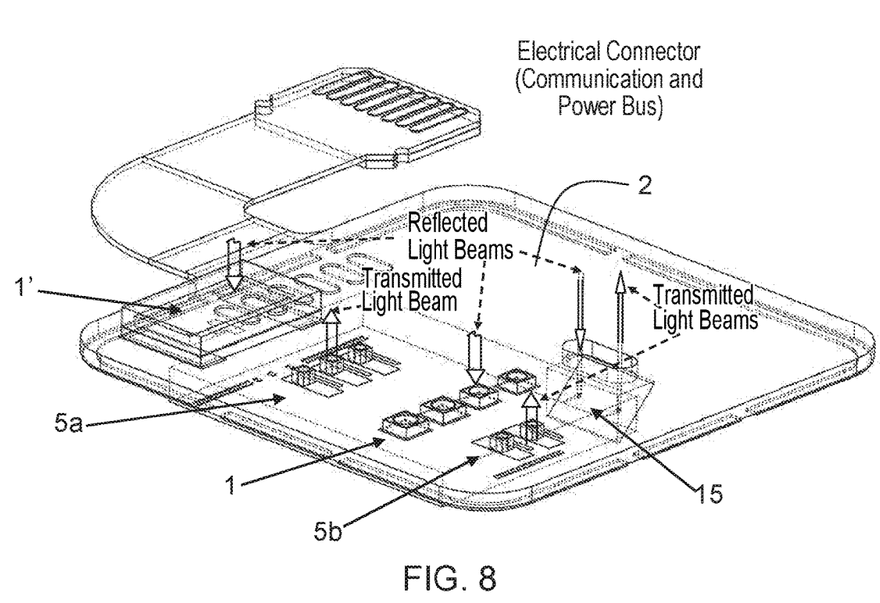
FIG. 8 shows the optical sensing module of FIG. 7 with an incorporated reflecting mirror.
Figure 9:
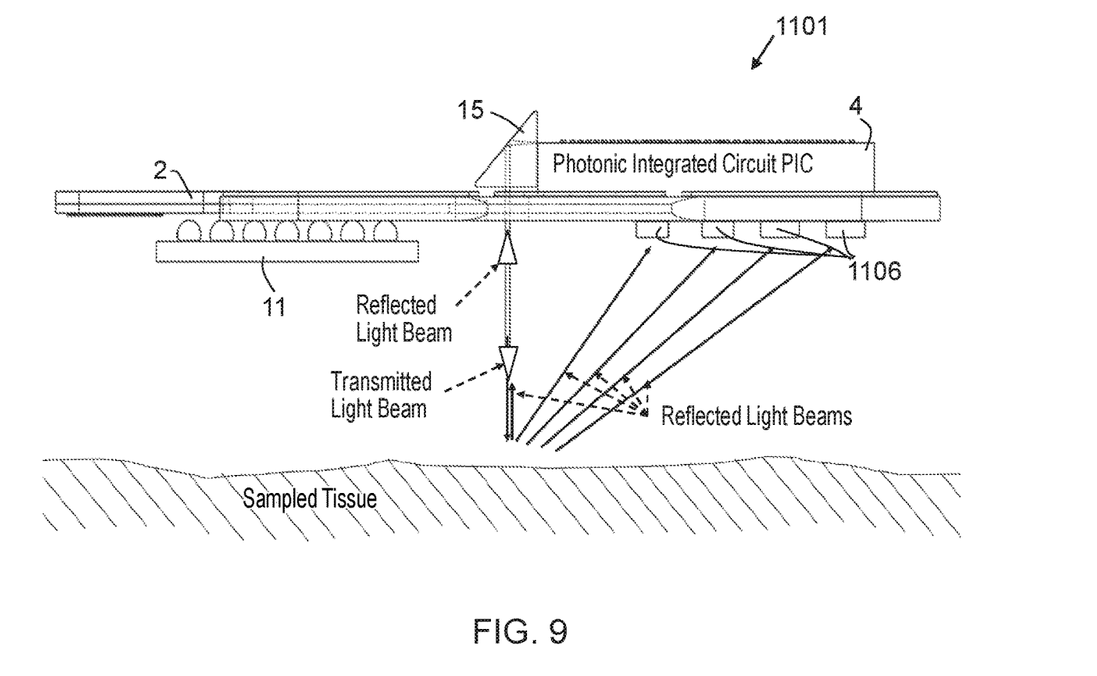
FIG. 9 shows the optical sensing module of FIG. 8 in operation.

A microcontroller 11 is located on the back side of substrate 2 of the optical sensing module 1000, i.e. opposite the PIC 4. Electrical connector 13 provides electrical signals to the optical sensing module, and a protective casing 7 (shown in FIG. 7C) including a lid and a base, acts to cover the PIC 4 and other components to minimize the risk of damage during use. In the example of FIG. 8, the optical sensing module 1000 includes a large area detector array comprising smaller photodetector pixels 1106, which is seen in FIG. 9.

The operation of the optical sensing module 1000 is described with reference to FIG. 9. Once manipulated (e.g. multiplexed), light from the plurality of lasers exits the PIC 4 and therefore the optical sensing module 1000 via one or more optical output ports 12. Light may be launched into free space from a waveguide facet (a "launch facet") at or near the edge of the PIC 4. An optical element such as a mirror 15 takes the light from the plane of the waveguide platform and translate it into a direction more suitable for interrogating a sampled tissue (e.g. user's skin). The direction (see transmitted/reflected light beam) may be orthogonal or substantially orthogonal to the plane of the PIC 4.

Back-scattered light (see reflected light beams) from the surface of the skin, and from within a volume below the surface of the skin, returns to the launch facet (or, in some embodiments, a different waveguide facet) on the PIC 4 to be analyzed. Specifically, the reflected light returns to the PIC 4 to illuminate the respective active areas of the photodiodes 1, 1' and/or photodetector pixels 1106.

Figure 7A:
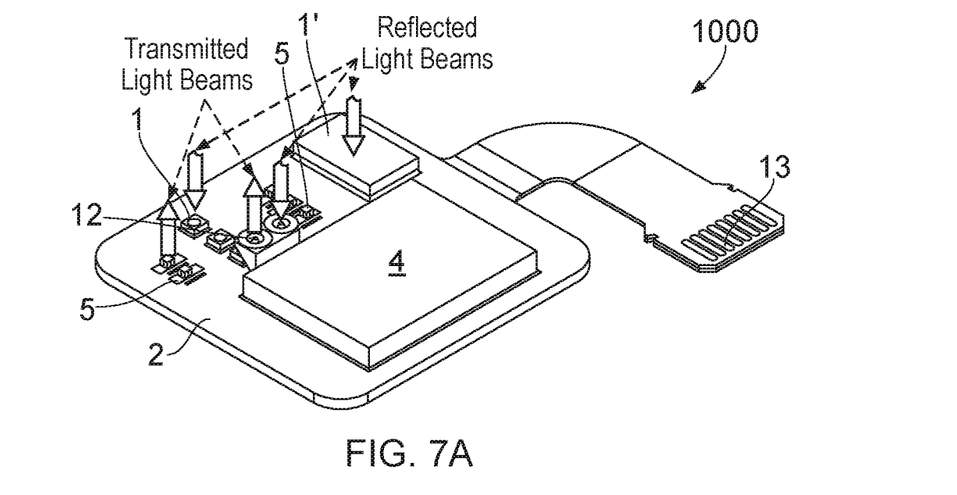
FIGS. 7A-7C show respectively a front view, a back view, and a cross-sectional view of an optical sensing module comprised by the wearable sensor system which may comprise a photodiode according to the present invention.
Figure 7B:
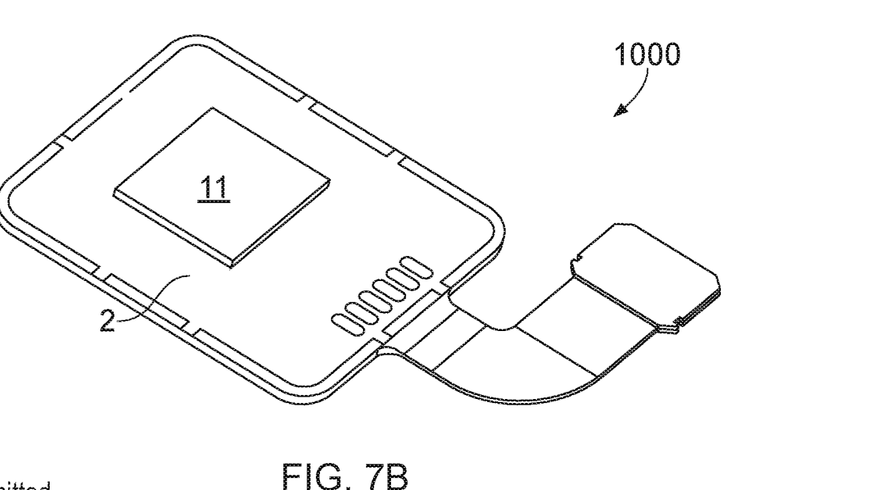
Figure 7C:
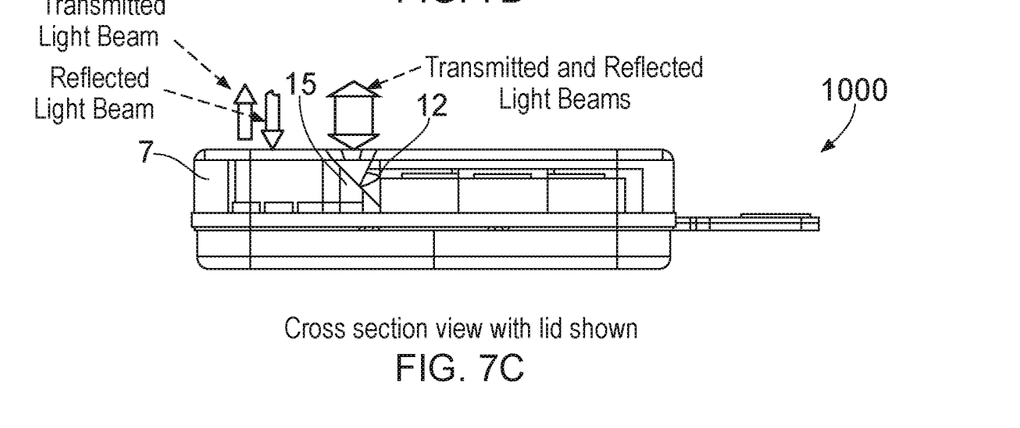
Figure 10:
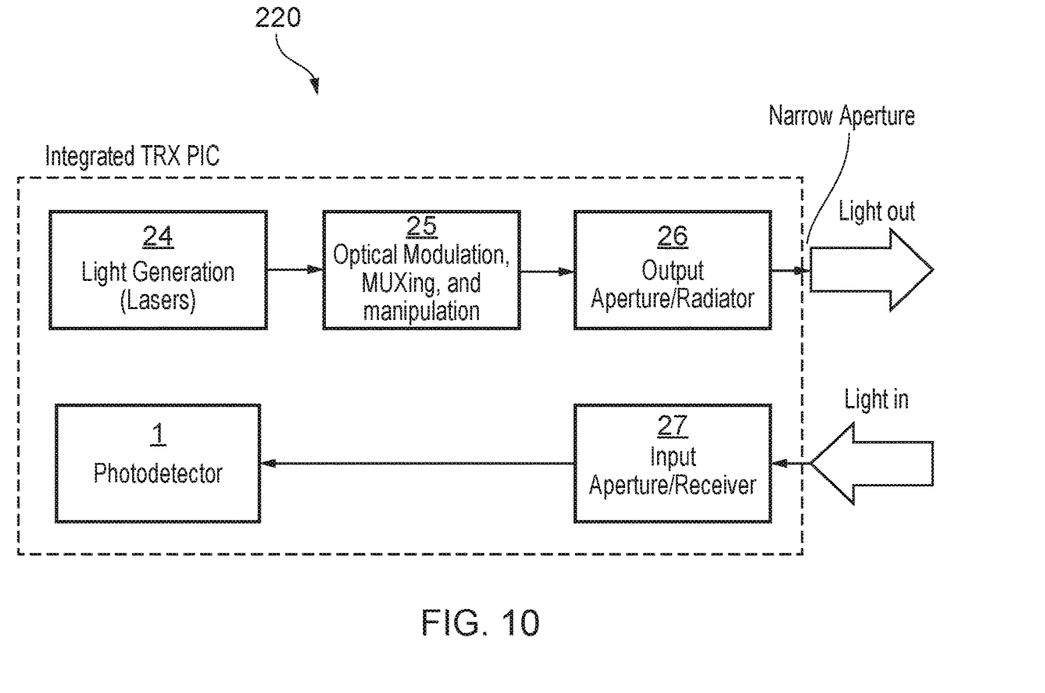
FIG. 10 schematically shows a variant of the optical sensing module of FIGS. 7-8 comprising a single transmitter/receiver PIC with integrated photodetectors.

FIG. 10 is a block diagram schematically showing a variant of the optical sensing module of FIGS. 7A-8 comprising a single transmitter/receiver PIC 4 with an integrated photodetector 1, such as the photodiode 1 of the first aspect.

In relation to the transmitter functionality, the plurality of lasers 24 provides light of different wavelengths to the optical manipulation region 25 before being output at the one or more optical outputs 26. In relation to the receiver functionality, light is received at one or more input apertures 27 which are optically coupled to the photodiode 1.

Figure 11:
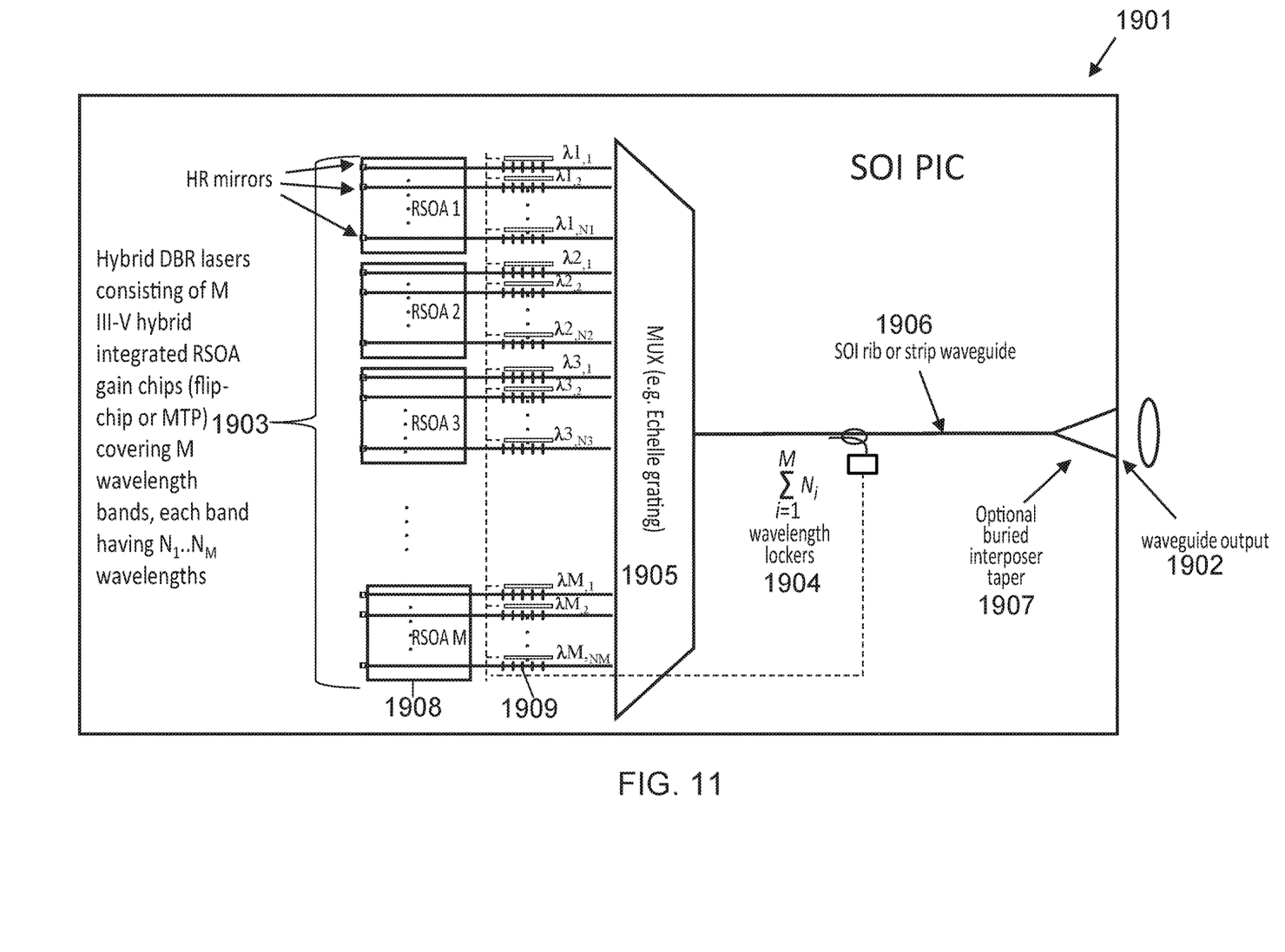
FIG. 11 is an example of a transmitter PIC with a single output aperture which may form part of an optical sensing module.

FIG. 11 is an example of a transmitter PIC 1901 with a single waveguide output aperture 1902 which may form part of an optical sensing module 1000 for non-invasive biomarker measurement. Here, the plurality of lasers takes the form of a plurality of hybrid DBR lasers 1903 consisting of M III-V hybrid integrated RSOA gain chips or coupons 1908 (mounted by flip-chip or micro transfer printed (MTP)) covering M wavelength bands, each band having 1 ... N wavelengths. Each of the M RSOAs is optically coupled to N DBR waveguides, each DBR waveguide 1909 selecting a sub-band within the wavelength band of the RSOA to give rise to N wavelengths within each of the M wavelength bands. The total number of output wavelengths from the plurality of lasers is therefore N×M. For each laser, highly reflective mirrors are located at one end of the laser cavity, within the RSOA. The III-V RSOA gain chips or coupons can be hybrid integrated such that the optical mode in the RSOA waveguide is edge-coupled to the Si or SiN PIC waveguide, such that the light in the RSOAs and in the Si or SiN PIC waveguides stay in the same plane (A. J. Zilkie et al., Power-efficient III-V/Silicon external cavity DBR lasers, et al., Optics Express, Vol 20, (21) page 23456 (2012); A. J. Zilkie et al., Multi-Micron Silicon Platform for Highly Manufacturable and Versatile Photonic Integrated Circuits, IEEE J. Sel. Topics in Quantum Electronics, Vol 25, (5) (2019); Loi R, et al., Transfer printing of AlGaInAs/InP etched facet lasers to Si substrates. IEEE Photonics Journal. Vol 8, (6) pages 1-10 (2016)). In one example, only one laser is turned on in each time window, and in that time window the photodiode 1 detects the reflected signal from that wavelength. The lasers are then cycled through. The PIC shown in FIG. 11 has an SOI platform. The same architecture could also be applied on a SiN platform, the choice of waveguide platform depending on the wavelengths of operation of the lasers. It may be envisaged that a single platform may include SOI and SiN components.

Light from the plurality of lasers 1903 is combined by a multiplexing component (MUX) 1905 such as an Echelle grating into a single waveguide, which may take the form of an SOI rib or strip waveguide 1906 with height ranging from 1 um to 3.5 um and width ranging from 1 um to 3.5 um. The waveguide may couple to an output via an optional buried interposer taper 1907, which may for example be enabled by the use of a double-SOI wafer (a wafer with two buried oxide layers) to expand the output mode to 12×12 um. The waveguide output may be an etched, angled and AR-coated facet. For each wavelength, a wavelength locker feedback loop 1904 may be included. Wavelength locking may be as described in U.S. Ser. No. 10/677,989 and U.S. Ser. No. 10/739,256.

In some examples, the wearable sensor system comprising the optical sensing module 1000 discussed above is further configured such that the/each photodiode 1, 1' is provided with a temperature control (not shown). Conveniently, the temperature control can reduce variations/fluctuation in operation temperature of the/each photodiode 1, 1' thereby stabilizing its thermal performance. For example, the temperature control may be configured such that the operation temperature of the photodiode varies by no more than a few degrees during all operation conditions.

The temperature control can be configured in different ways.

In one example, the temperature control uses a user's body as a heat sink. Thus, the user's body temperature is used as a reference temperature to which the photodiode's operation temperature is locked. Thus, when the user's body is warmer than the photodiode, the photodiode's operation temperature can be increased, and when the photodiode is warmer than the user's body, the photodiode can reject heat into the user's body, thereby reducing its operation temperature. Therefore, the photodiode's operation temperature can be stabilized around the user's body temperature.

In another example, the variable operation of the plurality of lasers 1903 may be adjusted such that the operation temperature of the/each photodiode 1, 1' is maintained constant.

Alternatively, the plurality of lasers 1903 may be activated to simultaneously emit light periodically, e.g. every e.g. 100 μs-1 ms, such that "on" periods of light generation are followed by "off" periods of no light generation. In this case, the temperature control may be realized by a variable-temperature element, e.g. a heater, coupled to the/each photodiode. Specifically, the variable-temperature element may vary its temperature based on the variable duty-cycle operation of the plurality of lasers. For example, the variable-temperature element may increase its temperature during "off" periods of no light generation such that the photodiode's operation temperature is prevented from falling below a predetermined threshold.

Although exemplary embodiments of a photodiode for a wearable sensor system have been specifically described and illustrated herein, many modifications and variations will be apparent to those skilled in the art. Accordingly, it is to be understood that a photodiode for a wearable sensor system constructed according to principles of this invention may be embodied other than as specifically described herein. The invention is also defined in the following claims, and equivalents thereof

What is claimed is:

1. A photodiode for a wearable sensor system, the photodiode having:
    a rectangular active area sensitive to wavelengths within the spectral range of 1200 nm to 2400 nm,
    wherein the photodiode comprises a temperature control for controlling an operation temperature of the photodiode, and
    wherein the temperature control uses a user's body as a heat sink.

2. The photodiode of claim 1, having a cutoff wavelength of 2500 nm or less, at operation temperature within the range of 25° C. to 35° C.

3. The photodiode of claim 2, having a cutoff wavelength of 2450 nm or less at operation temperature within the range of 25° C. to 35° C.

4. The photodiode of claim 3, wherein the active area is formed of extended InGaAs.

5. The photodiode of claim 1, wherein the active area is formed of InGaAs.

6. The photodiode of claim 1, wherein the temperature control further comprises a variable-temperature element coupled to the photodiode.

7. The photodiode of claim 1, wherein the temperature control further comprises a light source configured for variable duty-cycle operation.

8. The photodiode of claim 7, wherein the light source is located on a photonic integrated circuit, PIC.

9. The photodiode of claim 8, wherein the light source is a laser.

10. The photodiode of claim 1, having a shunt resistance of at least 100 kΩ, or at least 175 kΩ, or at least 300 kΩ at an operation temperature within the range of 25° C. to 35° C.

11. The photodiode of claim 1, having a signal-to-noise ratio of at least 5.0, or at least 8.0, or at least 14.9 at an operation temperature within the range of 25° C. to 35° C.

12. The photodiode of claim 1, having a spectral responsivity of at least 0.8 A/W, or at least 1.2 A/W at operation wavelength of 2400 nm and/or at operation temperature within the range of 25° C. to 35° C.

13. A wearable sensor system, comprising the photodiode of claim 1.

14. The wearable sensor system of claim 13, further comprising a light source located adjacent to the photodiode on the same surface of the sensor system, the light source configured to generate light within the range of 1200 nm to 2400 nm.

15. The wearable sensor system of claim 14, wherein a separation between a centre of an output of the light source and proximal edge of the photodiode is no more than 1 mm for wavelengths within the range from 2000 nm to 2400 nm, and no more than 3 mm for wavelengths within the range from 1200 nm to 1800 nm.

\* \* \* \* \*